United States Patent

[11] 3,625,493

| | | |
|---|---|---|
| [72] | Inventor | Edward E. Hunter<br>Akron, Ohio |
| [21] | Appl. No. | 12,978 |
| [22] | Filed | Feb. 20, 1970 |
| [45] | Patented | Dec. 7, 1971 |
| [73] | Assignee | The Goodyear Tire & Rubber Company<br>Akron, Ohio |

[54] MODULAR HEATING UNIT FOR PROCESSING TIRE CORD FABRIC
30 Claims, 5 Drawing Figs.

[52] U.S. Cl.................................................. 263/3,
34/155
[51] Int. Cl.................................................. F27b 9/28
[50] Field of Search.......................................... 263/3;
34/155, 157, 160

[56] References Cited
UNITED STATES PATENTS

| 2,546,538 | 3/1951 | Erhardt, Jr. ................. | 34/155 X |
| 3,231,985 | 2/1966 | Smith, Jr. ..................... | 34/157 |
| 3,254,422 | 6/1966 | Defiel........................... | 34/155 X |

*Primary Examiner*—John J. Camby
*Attorneys*—F. W. Brunner and Harlan E. Hummer

ABSTRACT: A large composite oven formed from a number of smaller individual modular heating units or ovens, which are disposed in side-by-side relation. The temperature of gas used in the processing of the fabric is individually controlled and regulated in each unit separate from the other units. A system is provided for moving a continuous sheet of tire cord fabric successively through adjacent modular units until the fabric is completely processed. The units each include an elongated heat chamber with means for forcibly impinging streams of temperature conditioned gas against the fabric as it moves in alternate directions through the heat chamber. A system is provided for conditioning gas and circulating it to the means for impinging the gas against the fabric.

INVENTOR
EDWARD E. HUNTER
ATTORNEY

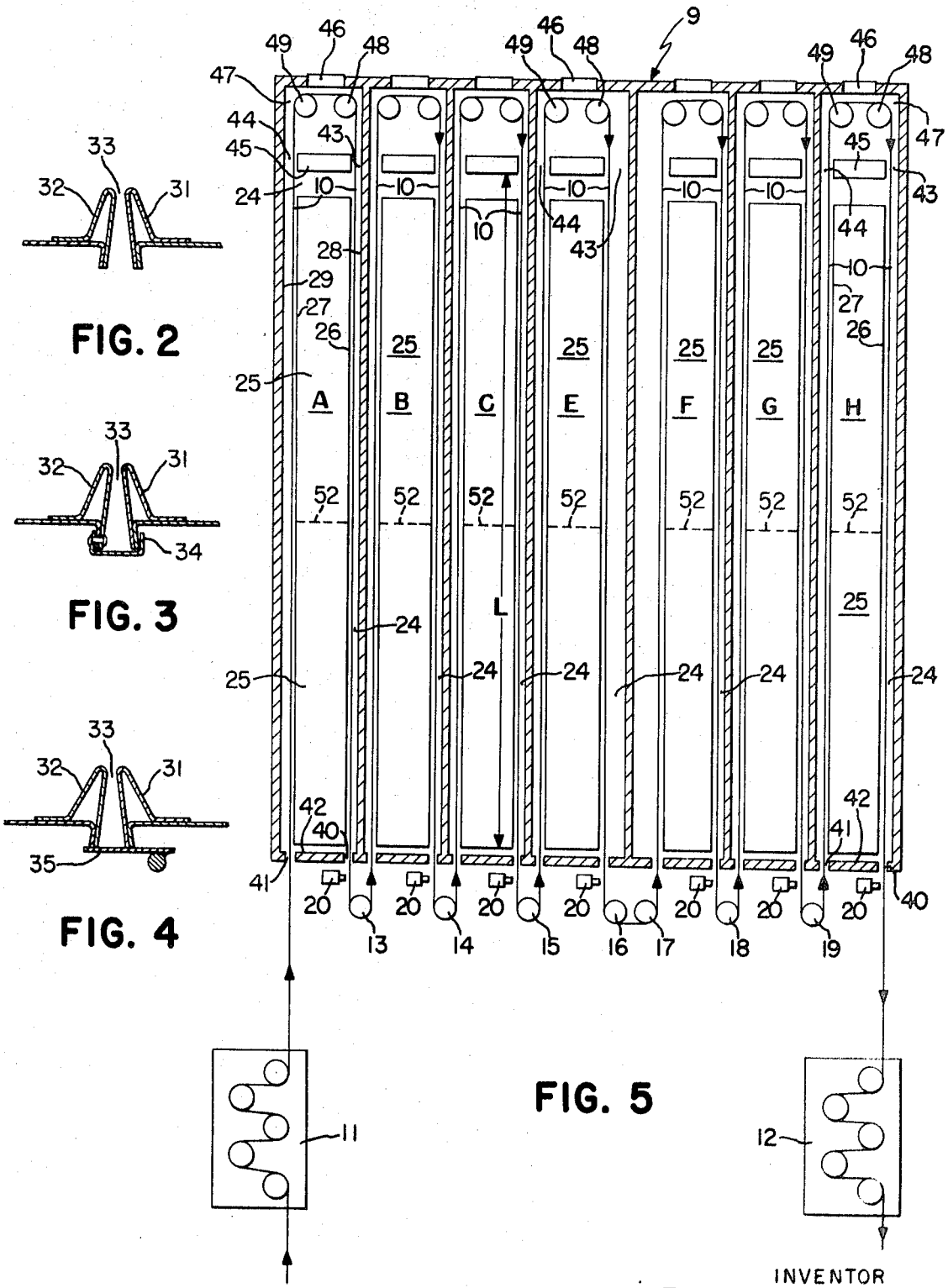

MODULAR HEATING UNIT FOR PROCESSING TIRE CORD FABRIC

BACKGROUND OF THE INVENTION

Time, temperature, and tension are important factors in the processing or treatment of fabrics suitable for use in building pneumatic tires, especially fabrics having tire reinforcing cords made of polyester, nylon, and rayon. For example, a difference of 5 from a desired processing temperature could, in some cases, be detrimental to the fabric. Many such processes are carried out in large ovens having spacious heat-treating chambers through which a continuous sheet of fabric is moved at relatively high speeds between and around a number of vertically spaced and staggered rollers or pulleys. It requires little imagination to appreciate the difficulties of controlling temperatures of heated gas circulating through such capacious chambers, especially since the flow pattern of the circulating gas is generally unpredictable. Under such conditions, undesirable coldspots, i.e. areas where the heated gas is below a desired temperature, usually develop and impede the processing of the fabric.

Moreover, larger ovens are generally tailored for a particular process and not readily adapted to changes in the process. Oftentimes, it is necessary to completely remodel such ovens, or dismantle and replace them with new units when the process is changed appreciably. Many of the problems encountered using large heat-treating ovens are eliminated or substantially reduced by dividing the oven into a number of smaller modular, i.e. similar design, ovens or units in which the tire cord fabric is alternately moved and treated. The processing conditions of the smaller units are individually regulated and more precisely controlled, and can be readily altered to meet changing needs in the treatment of the fabric. The invention is directed to providing a modular unit which can be coupled with other similar units for treating tire cord fabric in more accurately controlled stages.

Briefly stated, the invention is a composite heat-treating oven formed from a plurality of individually regulated, modular ovens or units disposed in side-by-side relation. Means are provided for moving a continuous sheet of tire cord fabric successively through adjacent modular units. Each modular unit has a heating chamber, which is equipped for impinging streams of heated gas laterally against the fabric as it moves in alternate directions through the chamber. Each unit is provided with means for maximum and minimum conditioning of the gas, such that each unit is capable of drying, heat treating, normalizing and cooling the fabric.

DESCRIPTION OF THE DRAWING

The following description of the invention will be better understood by having reference to the annexed drawing, wherein:

FIG. 2 is a cross section of a nozzle used with the modular unit;

FIG. 3 is another cross section of a nozzle showing a fixed damper for adjusting the flow of heated gas from the nozzle;

FIG. 4 is still another cross section of a nozzle showing an adjustable damper for varying the flow of heated gas from the nozzle; and FIG. 5 is a cross section of a composite oven.

DESCRIPTION OF THE INVENTION

Figure 1:
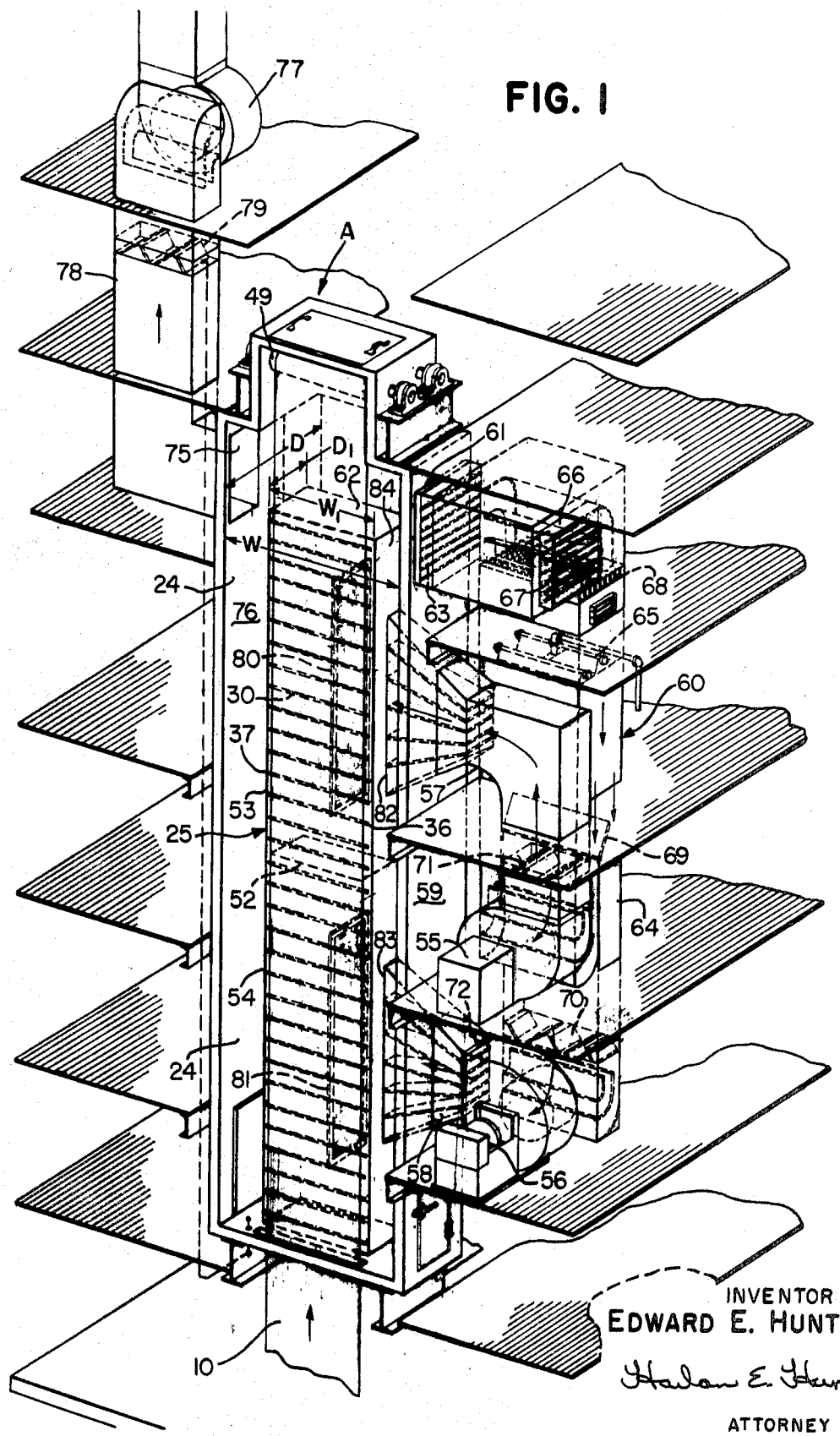
FIG. 1 is a perspective view of a modular heat-treating unit used with a number of similar units to form a composite oven for processing tire cord fabric.

Referring generally to the drawing, there is shown a composite oven, generally indicated at 9, in which tire cord fabric 10 is processed. The composite oven 9 comprises a plurality of individually controlled and operated modular heat-treating units or ovens A–H disposed in side-by-side relation. A pair of pull-roll assemblies 11 and 12 are disposed in fabric moving relation adjacent the first and last modular units A and H, for moving the tire cord fabric 10 through the composite oven 9 at different speeds (yards per minute) under corresponding predetermined tensions.

A series of rollers 13–19 are rotatably mounted outside the composite oven 9 for alternately directing the moving tire cord fabric 10 from one modular unit into the next adjacent modular unit through which the fabric succeedingly moves. The rollers 13–19 are deliberately placed outside the composite oven 9 in the ambient atmosphere. Being unheated, they will sweat as the heated fabric 10 contacts them. The moisture acts as a lubricant and keeps any undried fluid, e.g. adhesive for promoting the adhesion between the fabric and rubber, from adhering to, and building up on the roller. Such action adversely affects processing the fabric. For example, adhesive material adhering to a roller may fray or even break the tire reinforcing cords of the fabric.

Any suitable heat-sensing mechanism, e.g. pyrometers 20, are used to sense the temperature of the fabric 10 as it moves through the modular units A–H.

MODULAR HEAT TREATING OVEN

Each of the modular ovens or units A–H comprises an enclosed heating chamber 24, whose vertical length L is relatively long in comparison to its width W and depth D measured in a horizontal plane. An elongated hot air plenum 25 is vertically disposed within the heat chamber 24. The plenum 25 has a pair of opposing sides 26 and 27, which are in close proximity to adjacent opposing sides 28 and 29 of the heat chamber 24.

A plurality of nozzles, e.g. nozzle 30, are disposed in spaced vertical relation on the opposing sides 26 and 27 of the plenum 25. The nozzles 30 are substantially coextensive with the width W, of the plenum 25, which is at least as wide as the corresponding width of the tire cord fabric 10. For example, the tire cord fabric is generally about 5 feet wide and the plenum is usually 6 inches wider than the fabric.

Each of the nozzles 30 (FIGS. 2–4) comprises a pair of lips 31 and 32, which extend from the plenum 25 is spaced converging relation. The long thin opening 33 formed between the converging lips 31 and 32, is preferably about one-fourth inch wide.

A configured damper 34 is fixedly mounted in gas flow blocking relation on a predetermined number of nozzles 30 of the plenum 25. A flat platelike damper 35 is rotatably mounted adjacent a number of other nozzles 30 for regulating the flow of heated gas from these nozzles. The fixed and movable dampers 34 and 35 are generally disposed intermediate opposing ends 36 and 37 of the nozzles 30 on which they are used, and preferably block only the center portions of the nozzles 30, the reason for this being that it is more difficult heat-treating opposing sides or edges of the moving fabric. The dampers 34 and 35 are employed to profile the impinging heated gas laterally across the width of the moving fabric by combining a series of open and partially blocked nozzles 30 to ensure uniform processing of the fabric; that is, the fabric adjacent its sides will be treated in the same manner as the portions of the fabric adjacent the centerline of the fabric.

The tire cord fabric 10, as it moves in and out of each heat chamber 24, passes through a pair of elongated slots 40–41 disposed in parallel relation in the bottom 42 of each heat chamber 24. A similar pair of slots 43 and 44 are disposed in a cover plate 45 in vertical aligned relation to the slots 40 and 41. The cover 45 is disposed in vertical spaced relation below the head or top 46 of the heat chamber 24, defining a compartment 47 in which a pair of rollers 48 and 49 for changing the direction of movement of the fabric, are rotatably mounted in spaced relation corresponding to the spacing between the slots 43 and 44.

The plenum 25 can be continuous throughout its length or provided with a header 52 for dividing the plenum 25 into two equal vertically stacked segments 53 and 54.

GAS CONDITIONING SYSTEM

Any suitable means, e.g. fans 55 and 56, are provided for supplying heated or otherwise conditioned gas, e.g. air, under pressure, to the plenum 25. The fans 55 and 56 are disposed outside the heat chamber 24 and are in air-communicating relation with the plenum 25 through supply ducts 57 and 58 extending through the adjacent sidewall 59 of the heat chamber 24.

A system, generally indicated at 60, is provided for exhausting heated gas from the heat chamber 24. The exhaust system 60 includes an exhaust outlet 61 disposed in the chamber sidewall 59 adjacent the top 62 of the plenum 25. A number of movable dampers 63 are provided for regulating the flow of heated gas through the exhaust outlet 61. An exhaust duct 64 carries exhausted gas from the exhaust outlet 61 for reheating and recycling through the fans 55 and 56. A conventionally designed gas-fired burner 65 is disposed in the exhaust duct 64 for reheating exhausted gas for recirculation to the plenum 25.

A fresh air intake 66 is placed in the exhaust duct 64 in vertical spaced relation above the burner 65. A series of adjustable louvers 67 are provided for varying the flow of fresh air, e.g. air at ambient temperature, through the fresh air intake 66 into the exhaust duct 64.

A plurality of movable diffuser blades 68 are disposed in the exhaust duct 64 in spaced relation above the burner 65, to pattern the flow of gas through the burner 65 downward to the fans 55 and 56. A set of adjustable vanes 69 and 70 are provided in the exhaust duct 64 for regulating the flow of gas to the fans 55 and 56. A couple of control dampers 71 and 72 are positioned in the supply ducts 57 and 58 for controlling the flow of heated gas to the plenum 25.

An outlet port 75 is disposed in the opposing sidewall 76 of the heat chamber 24 adjacent the top 62 of the plenum 25. A fan 77 and air outlet duct 78 are in communicating relation with the air outlet 75 for removing a portion of the heated gas from the heat chamber 24. A number of control dampers 79 are arranged in the air outlet duct 78 for controlling the flow of gas exiting from the heat chamber 24 through the air outlet 75.

The temperature or condition of the air is readily controlled using the aforementioned devices to regulate the exhausting and removal of air, the replacement of removed air with fresh air, and the heating of the fresh and exhausted air for circulation to the heat chamber. In cases where the fabric must be cooled, the removal control dampers 79 would be opened and the exhaust dampers 63 shut. The fresh air louvers 67 would be fully opened and the burner 65 would be shut down. This would provide the maximum amount of cooling air at ambient temperature. The temperatures of the air can be easily regulated using the different dampers and fan combinations.

DIFFUSER SCREEN

A pair of screens 80 and 81 are, preferably, positioned in vertical spaced relation within the plenum 25 for diffusing heated gas uniformly throughout the plenum 25. The diffuser screens 80 and 81 are placed in predetermined horizontal spaced relation from a couple of air inlets 82 and 83, which are disposed in the sidewall 84 of the plenum 25 and communicate with the supply ducts 57 and 58. The diffuser screens 80 and 81 are provided with a number of openings or apertures, which are in predetermined relation to the spacing of the screens 80 and 81 from the air inlets 82 and 83. For example, the openings would comprise about two-thirds of the area of the screens 80 and 81, when the screens 80 and 81 are spaced from the air inlets 82 and 83 a distance equal to about one-third the width W, of the plenum 25. As previously indicated, the diffuser screens 80 and 81 help circulate the heated gas uniformly throughout the plenum 25. The heat impinged against the moving fabric 10 will be uniform laterally across the width of the fabric, if the heated gas passes laterally through the nozzles 30 at a uniform velocity.

It has been found that the velocity of the heated gas through the nozzles 30 should be at least about four times the velocity of the heated gas within the plenum 25, if the modular units A–H are to function or operate at greater efficiencies. The depth D, of the plenum 25, can be readily computed, knowing (1) the desired velocity of air impingement against the moving fabric, (2) the plenum width W, (generally set by the width of fabric), and (3) the air speed of the fans 55 and 56.

The overall processing of tire cord fabric is more easily and precisely controlled by dividing the large composite oven 9 into a number of smaller components units or modular ovens A–H, in which the temperatures of the heated gas are more accurately maintained. The modular units A–H are easily adapted to a system using computer control. This should be evident from the following example of a simplified system using alternate controls for processing a fabric having 1260/2 size nylon reinforcing cords.

The processing of tire cord fabric generally varies with the type of fabric and size of the reinforcing cords. The pull rolls of the assemblies 11 and 12 are set to operate or pull the aforementioned fabric with nylon cords through the composite oven 9 at a preferred speed of about 113 yards per minute yards per minute. Anticipating certain processing problems, an alternate system is set up to run the fabric through the composite oven 9 at a much slower speed of about 37 yards per minute. It should be apparent that, using the same oven 9, the processing temperatures must be adjusted, when the speed of the fabric drops from the preferred rate of 113 yards per minute to the lower rate of 37 yards per minute. The processing temperatures of the heated gas are correlated to the different fabric speeds by conventionally designed electrical controls. It is difficult to quickly adjust the temperature of the heated gas in a spacious heat chamber. Such is not the case when using the smaller modular units A–H. For example, the temperature of the hot gasses in the modular units A,B,C,E,F,G, and H, when the nylon fabric is run through the composite oven 9 at a speed of 113 yards per minute, are maintained at about 280° F., 300° F., 300° F., 300° F., 450° F., 450° F., and 450° F., respectively. The first four units A–E are used, for example, to dry the fabric which has been previously treated with adhesive material, and the last three units F–H are used to heattreat the nylon cord fabric. Conventionally designed thermocouples are placed in the heat chamber of each modular unit A–H to sense and monitor the temperature of the gas or heat within the heat chamber. In the case of a malfunction or processing imperfection which needs immediate correcting, e.g. a critical change in any of the aforementioned gas temperatures, the operator switches to the alternate system and the moving nylon fabric immediately slows to a speed of about 37 yards per minute.

The processing temperatures of the hot gasses in the modular units A–H are varied accordingly. The heated gas in the first five units A–F is maintained at the same aforementioned temperatures, but in the last two units G–H, the heated gas is cooled to about 250° F. and maintained as holding temperature for the fabric until the malfunction or impediment is corrected and the fabric speed increases to the preferred rate of 113 yards per minute. A second composite oven similar to oven 9 can be utilized for further drying and heat treating the moving fabric. This system is manually controlled but could be easily adapted to a system employing a computer for instantaneously varying the conditions for processing the fabric.

One of the primary advantages of using computer control for regulating operation of the modular ovens is the rapid rate at which the computer responds to vary processing conditions in any one of the units. For example, the computer can monitor temperature of the gas, and speeds of the fabric and, in a matter of seconds, respond and correct undesirable processing conditions by changing the fabric speeds and gas temperatures in succeeding or preceding units depending on the results desired. Moreover, in cases where rolls of different fabrics are spliced into the units, the computer can monitor movement of the splice through the units and correspondingly adjust the processing conditions in the preceding units to meet the needs of the oncoming different fabric. A computer system is able to effectively handle many modular units, especially if the units are made smaller in size to more effectively control temperatures of the gas. In such cases it would be physically impossible for operators to respond with sufficient speed to control the processing conditions in the individual units.

Thus, there has been described a new and novel modular oven, which is used in side-by-side relation with a plurality of other similar ovens in which tire cord fabric is successively processed. The temperatures of heated gas used in processing the tire fabric, are more precisely controlled and uniformly maintained within the heat chamber of the smaller, individual modular units. Moreover, similar air inlet and exhaust systems are used with each of the modular ovens A–H, making maximum and minimum processing techniques available in each of the units. It can be envisioned that, in some cases, some of the modular units could be shut down or even bypassed depending on the process desired. Thus, the units can be used interchangeably for (1) heat treating the fabric, e.g. heating and tensioning the fabric to change the crystalline structure of the tire cords to a more desirable stronger structure; (2) drying the fabric and adhesive applied thereto for increasing the bond between the fabric and rubberized material; (3) normalizing the fabric, e.g. heating and tensioning the fabric at lower tensions than when heat treating; or (4) cooling the fabric, e.g. impinging gas at ambient temperature against the fabric as it moves alternately through one of the units.

The combinations or manner in which the individual modular units A–H can be used together, are innumerable when compared with larger ovens, which are usually individually designed and suited for a particular process.

As previously indicated, such large ovens are not easily adapted to change, and oftentimes they must be dismantled and replaced, or completely rebuilt and altered to meet changing needs in the process. This is time consuming and expensive. The similar design and use of like components for building the modular units has proven much more economical, especially when a number of units are involved, which is generally the case when constructing an oven suitable for processing tire cord fabric.

The primary advantage of using a number of modular units is their adaptability to many different processes or time-temperature treatments, making this system highly desirable from a replacement standpoint. Moreover, the modular oven concept is more compatible for use with more sophisticated computer controls, which provide instantaneous reaction in correcting the time-temperature-tension treatment of the tire cord fabric, should the treatment, for some reason, vary from a preferred programmed treatment.

While certain representative embodiments and details have been shown for the purpose of illustrating the invention, it will be apparent to those skilled in the art that various changes and modifications may be made therein without departing from the spirit or scope of the invention.

What is claimed is:

1. A composite oven for processing tire cord fabric, comprising:
   a. a plurality of individual modular oven units having at least partially enclosed heat chambers adjacent fabric conveying and receiving relation;
   b. means for moving a continuous sheet of tire cord fabric successively through the heat chambers of the units;
   c. means for circulating only temperature-conditioned gas in contacting relation with fabric moving through the heat chambers to process said fabric; and
   d. means for conditioning gas circulated through the heat chamber of each unit independently of the other units, such that each unit is capable of alternately drying, heat treating, normalizing, and cooling fabric moving through the unit.

2. The composite oven of claim 1, wherein the gas conditioning means of each unit conditions gas to a maximum temperature for drying and heat treating fabric, and to a minimum temperature for cooling fabric, and to any temperature therebetween.

3. The composite oven of claim 1, wherein the means (c) and (d) are similar for each of the modular units and means are provided for correlating the operation of each said means (b), (c) and (d) to process the fabric in a preferred manner with alternate time-temperature treatments for producing the same desired processing of the fabric.

4. The composite oven of claim 1, wherein the gas-conditioning means includes means for changing the temperature of gas circulated through the chamber of at least one of the units in response to a deviation from a predetermined desired time-temperature treatment of the fabric in the oven, including a preferred gas temperature in each of the units and preferred velocity at which the fabric is moved through the oven.

5. The composite oven of claim 4, wherein the velocity at which the fabric is moved through the oven is changed in corresponding relation to significant changes in the processing temperature of gas circulated through the chambers of the units.

6. The composite oven of claim 1, wherein the chambers are vertically disposed in side-by-side relation and separate means (c) and (d) are provided for each unit.

7. The composite oven of claim 6, wherein the gas circulating means (c) includes means for impinging spaced streams of conditioned gas, under pressure, laterally against fabric moving through the chambers of the units.

8. The composite oven of claim 7, wherein the fabric moving means (b) includes means for moving the fabric in alternate axial directions through the chambers of the units.

9. The composite oven of claim 1, which includes at least one roller disposed outside the heat chamber of the first unit through which fabric moves, for engaging and changing the direction of movement of the fabric, and means for lubricating the roller to keep material such as undried adhesive on the fabric from adhering to the roller.

10. The composite oven of claim 1, wherein the gas circulating means (c) includes:
    e. an elongated plenum centrally disposed in vertical axial relation within the chamber of each unit;
    f. a plurality of horizontally disposed nozzles vertically spaced on the plenum for directing conditioned gas against the fabric moving adjacent the plenum; and
    g. means for profiling conditioned gas exiting from the nozzles to process the fabric similarly throughout its length and width.

11. The composite oven of claim 10, which includes:
    h. means for circulating conditioned gas through the plenum into the chamber of each unit;
    i. means for exhausting gas from the chamber of each unit;
    j. means for removing a portion of the conditioned gas from the chamber of each unit; and
    k. means for replacing the portions of conditioned gas removed from the chamber of each unit with unconditioned gas.

12. The composite oven of claim 11, wherein the gas conditioning means includes:
    m. a gas-fired burner associated with each unit for heating gas;
    n. means for passing gas, exhausted from the chamber, in heat-exchanging relation through the burner; and
    o. means for recirculating heated gas from the burner to the plenum.

13. The composite oven of claim 12, wherein each unit has separate and similar means (c) and (d) for conditioning and circulating gas through its chamber, and means are provided for correlating the operation of each said means (b), (c) and (d) to process the fabric in a preferred manner with alternate time-temperature treatments for producing the same desired processing of the fabric.

14. A composite oven for processing tire cord fabric, comprising:

a. a plurality of modular oven units having at least partially enclosed, elongated heat chambers vertically disposed in side-by-side relation;
b. means for moving a continuous sheet of tire cord fabric successively through the heat chambers;
c. means for moving the fabric in alternate directions axially through the heat chamber of each unit;
d. similar means associated with each unit for separately temperature conditioning gas outside the chamber of the unit and circulating the conditioned gas through its chamber independently of the other chambers and units, each of said means including:
  1. means, centrally disposed in a corresponding chamber between the fabric moving therethrough, for impinging horizontal streams of conditioned gas in vertical spaced relation against the fabric as it moves in alternate directions through the corresponding chamber;
  2. means for exhausting conditioned gas from the corresponding chamber;
  3. means for reconditioning exhausted conditioned gas for recirculation to the corresponding chamber;
  4. means for removing a portion of conditioned gas from the corresponding chamber;
  5. means for replacing the portion of conditioned gas removed from the corresponding chamber with fresh, unconditioned gas; and
  6. means for conditioning the unconditioned gas for circulation to the corresponding chamber;
e. means for correlating operation of the means (c) and (d) to process the fabric in a preferred manner with alternate time-temperature treatments for producing the same desired processing of the fabric.

15. The composite oven of claim 14, which includes:
f. means for changing the temperature of conditioned gas in at least one of the units in response to a deviation from the preferred manner of processing the fabric, including a preferred velocity at which the fabric moves through the oven.

16. The composite oven of claim 15, which includes:
g. means for changing the velocity at which the fabric moves through the oven in corresponding relation to a significant change in the preferred manner of processing the fabric, especially a critical change in the temperature of conditioned gas used for processing the fabric.

17. The composite oven of claim 16, wherein the means (i) for impinging horizontal streams of gas against the fabric includes:
  7. an elongated plenum centrally axially disposed in the chamber; and
  8. a plurality of horizontal nozzles vertically spaced on a pair of opposing sides of the plenum for directing conditioned gas into contacting relation with fabric moving adjacent the sides of the plenum.

18. The composite oven of claim 17, which includes:
  9. means for profiling the flow of conditioned gas from the nozzles to process the fabric equally throughout its length and width.

19. The composite oven of claim 18, which includes:
h. means disposed within each plenum for dispersing the conditioned gas throughout the plenum for uniform movement horizontally through the nozzles.

20. The composite oven of claim 14, wherein the means (d) is designed to vary the time-temperature treatment of the fabric in each chamber such that each of the units can be used alternately for drying, heat treating, normalizing and cooling fabric.

21. A composite oven for processing tire cord fabric, comprising:
a. a plurality of modular oven units having heat chambers in side-by-side fabric conveying and receiving relation;
b. means for moving a continuous sheet of tire cord fabric successively through the heat chambers;
c. means for circulating gas in contacting relation against fabric moving through the heat chambers;
d. means for regulating the temperature of gas circulated in each of the heat chambers;
e. means for controlling the velocity at which fabric moves through the heat chambers;
f. means for monitoring the temperature of gas in each of the heat chambers and the velocity of the fabric;
g. means for changing the temperature of gas contacting the fabric in at least one of the units in response to a change in the gas temperature of any of the units from a predetermined desired temperature.

22. The oven of claim 21, which includes:
h. means for changing the velocity of the fabric in response to a change in the gas temperature of any of the units from a predetermined desired temperature.

23. The oven of claim 21, which includes:
i. means for changing the temperature of gas contacting the fabric in at least one of the units in response to a change in the velocity of the fabric from a predetermined desired temperature.

24. The oven of claim 21, which includes:
j. means for tensioning the fabric as it moves through the heat chambers.

25. The oven of claim 21, which includes:
k. means for moving the fabric in alternate directions through the heat chambers; and
m. means for impinging spaced streams of temperature conditioned gas against the fabric as it moves in alternate directions through the heat chambers.

26. The oven of claim 25, wherein the gas temperature regulating means includes:
n. means for exhausting gas from each of the heat chambers; and
o. means for heating the exhausted gas for recirculation to the heat chambers.

27. The oven of claim 26, which includes:
p. means for removing at least a portion of the gas from each of the heat chambers; and
q. means for replacing the removed gas with fresh unconditioned gas at ambient temperature.

28. A method of processing tire cord fabric comprising the steps of:
a. moving a continuous sheet of tire cord fabric at a predetermined preferred velocity successively through a plurality of at least partially enclosed chambers disposed in side-by-side relation;
b. separately conditioning gas to predetermined preferred temperatures for circulation to each of the chambers; and
c. impinging only the conditioned gas, at preferred temperatures, against the fabric as it moves through the chambers.

29. The method of claim 28, which includes:
d. deviating from the preferred velocity to a slower velocity; and
e. changing the temperature of conditioned gas in at least one chamber in corresponding relation to the change in velocity.

30. The method of claim 22, which includes:
f. tensioning the fabric as it moves through the chambers.

* * * * *

UNITED STATES PATENT OFFICE
CERTIFICATE OF CORRECTION

Patent No. 3,625,493     Dated December 7, 1971

Inventor(s) Edward E Hunter

It is certified that error appears in the above-identified patent and that said Letters Patent are hereby corrected as shown below:

Column 1, line 9, "5" should read -- 5 degrees --.
Column 2, line 40, "25 is" should read -- 25 in --.

Claim 1, line 4, "chambers adjacent" should read -- chambers in adjacent --.

Signed and sealed this 23rd day of May 1972.

(SEAL)
Attest:

EDWARD M. FLETCHER, JR.
Attesting Officer

ROBERT GOTTSCHALK
Commissioner of Patents